United States Patent Office 3,482,999
Patented Dec. 9, 1969

3,482,999
PROCESS FOR REDUCING THE MOISTURE CONTENT OF CHEESE
Edmund H. Cornwell, Oak Lawn, and Herbert G. Foster, Jr., Hazel Crest, Ill., assignors to Swift & Company, Chicago, Ill., a corporation of Illinois
No Drawing. Filed Apr. 22, 1966, Ser. No. 544,394
Int. Cl. A23c 19/00
U.S. Cl. 99—115                                                    3 Claims

ABSTRACT OF THE DISCLOSURE

Method of drying cheese having a high moisture content comprising cutting said cheese into chunks large enough to preclude excessive mechanical working and small enough to present adequate surface area during drying, and subsequently drying said chunks in an atmosphere of circulating air having a temperature low enough to preclude exudation of fat and case-hardening of the cheese surfaces.

---

The present invention relates to a method of drying cheese. More specifically, the present invention relates to a method for drying high-moisture cheese without causing the loss of normal fat content or case-hardening of the cheese surfaces.

As used herein, the term "high-fat cheese" is used to denote cheeses having at least 40% milk fat based upon the weight of the dry cheese solids. Included are, for example, Cheddar, washed curd, Colby, granular (stirred curd), Swiss (Emmentaler), Gruyere, brick, Muenster, Edam, Gouda, blue, Gorgonzola, Roquefort, Limburger, Monterey, and high-moisture jack cheeses. The term "low moisture" cheese refers herein to those cheeses having a normal moisture content below about 42%. The moisture and fat content of the most common high-fat, low moisture cheeses is given in tabular form below.[1]

| Type | Percent fat contained in solids (min.) | Percent moisture (max.) |
|---|---|---|
| Cheddar | 50 | 39 |
| Washed curd | 50 | 42 |
| Colby | 50 | 40 |
| Granular | 50 | 39 |
| Swiss | 43 | 41 |
| Gruyere | 45 | 39 |
| Gorgonzola | 50 | 42 |

In the process of manufacturing cheeses, and particularly the low-moisture cheeses, as herein defined, there is produced a considerable quantity of product having a moisture content above the limit imposed by U.S. Government regulations. Because of this high moisture content, such products have heretofore been used mainly in the production of various process cheeses. Such products include, for example, grated cheese, cheese spreads, blended cheeses, and cheese food containing added dehydrated milk or milk products.

Because the various process cheese products are generally less valuable than top-quality cheeses of the proper fat and moisture content, many attempts have been made to dry cheeses, to the proper moisture and fat level. Such attempts have heretofore been unsuccessful, primarily because of exudation, or separation of milk fat from the product, during the drying process. As a result, the dehydrated cheese products presently known in the art usually have a fat content much below normal. In order to prevent exudation, it has been necessary in the past to case-harden the cheese by heating it to a relatively high temperature.

[1] The limits of fat and moisture content are taken from volume 21 of the Code of Federal Regulations, Part 19 (1959).

Except when employed as a grated cheese, such case-hardened products have very undesirable texture, a tough surface, and are extremely difficult to blend with top-quality cheese.

As an alternative to, or even in combination with, case-hardening, powdered milk products have been added to dried cheese in order to absorb the fat which exudes. Such products are not true cheeses, however, because of the added milk product.

Because the problems of exudation and case-hardening during the drying of cheeses have remained largely unsolved, there is a great need for a process by means of which cheeses can be dried without causing the above-described deleterious effects.

It is therefore an object of the present invention to provide an improved method for drying cheese.

It is another object of this invention to provide a method for drying cheese without causing a loss of fat or case-hardening of the cheese surfaces.

It is another object of this invention to raise the quality of high-moisture cheeses to a level comparable to that of top-quality cheese of the proper moisture and fat content.

Further objects and advantages of the present invention will become apparent from the following description.

Generally, the method of the present invention comprises a process wherein moist cheese is cut into chunks large enough that excessive mechanical working is avoided during the cutting process and small enough to present an adequate surface area during the subsequent drying process. After cutting the cheese into units of the proper size, it is dried in circulating air by heating it to a temperature which is not sufficiently high to produce the undesirable effects of exudation of the fat and case-hardening of the cheese surfaces.

In the drying cheese, and especially in the drying of a cheese having a relatively high fat content, it is essential that case-hardening and loss of fat be avoided if a high-quality product is desired. The principal source of fat loss is exudation of the fat to the surface of the cheese caused by excessive mechanical working. Case-hardening or "tempering" results from oxidation of the fat near the surface when the cheese particles are overheated during the drying operation. It has now been found that these deleterious effects may be entirely avoided by drying the cheese by means of a process which avoids excessive heating and mechanical working.

The principal sources of mechanical working during the usual process of drying cheese are in the grinding or slicing operations prior to drying and in the agitation of the cheese during the actual drying operation. In the grinding or slicing operation, the excessive working results from the fact that the slices are thin or the ground particles are small, causing a great deal of working at virtually every point in the cheese mass being so ground or sliced. In the present invention, such working of the interstices of the cheese mass is largely avoided by cutting the cheese into units of a size large enough that the cutting operation affects only a very minor portion of the cheese mass. On the other hand, it is important that the cheese chunks not be so large as to impair efficiency of the drying process by presenting too little surface area. It has been found that cutting the cheese into chunks having a length,, width, and height, each measuring from about ¼ inch to about 4 inches, produces the best results. While satisfactory results have been produced with chunks as small as ⅛ inch for each dimension, reducing the cheese to such a small size produces some danger of excessive mechanical working. Cutting the cheese to a size below the specified range will result in excessive working, bringing a substantial portion of the fat to the surface, while chunks above the specified range provide too little surface area to be dried efficiently.

Although the shape of the chunks bears no significant relation to the efficiency of the drying process, it is generally preferred that they be in the shape of a cube or a rectangular solid. The reason for this preference is that the cutting operation is most simple and efficient when the knife or cutting wire is simply drawn through the cheese mass in mutually perpendicular directions to divide the mass into the units of equal size.

After the cheese mass has been cut into chunks of the proper size, it is ready for the actual drying operation. Although such drying may take place when the cheese is simply heated in a stationary position, truly efficient drying of large quantities of cheese requires agitation of the cheese together with heating. It is also important that circulating atmosphere be provided in order to carry away the moisture which evaporates.

Just as the avoidance of mechanical working is important in the cutting operation, it is also important in the drying operation. Thus, gentle tumbling is the preferred method of agitation, while stirring or high-speed tumbling must be avoided. It has been found that tumbling will produce no appreciable mechanical agitation if the tumbling speed is maintained below about 200 inches per minute, expressed as the linear velocity of the cheese in relation to the dryer surface. Clearly, there will be no lower limit on the tumbling speed, so long as it is adequate to expose all of the surfaces of the cheese chunks to the atmosphere. The drying operation may be carried out with virtually any equipment that is capable of providing a tumbling action. Moving, inclined belts and vibrating platforms may be used, but the drum drier is generally preferred because of the relative simplicity and ease with which the process may be carried out continuously in such equipment.

In addition to tumbling, it is advantageous that the cheese particles be heated and subjected to a current of warm, moving air. For several reasons, however, it is important that the temperature of the cheese and the surrounding air be kept relatively low. First, when the cheese is heated to a high temperature, it tends to become soft and pliable, and is thus more susceptible to mechanical working during agitation. Second, high temperatures tend to cause an undesirable tempering or case-hardening of the cheese surfaces, which prevents the efficient removal of moisture and harms the smooth texture of the finished product. It has been found that if the temperature of the cheese is not allowed to rise above about 95° F., while the temperature of the surrounding air is maintained at temperatures up to about 100° F., case-hardening and oil separation from excessive heating will be substantially avoided. Heating of the cheese may be produced by any method which will not add moisture to the cheese. While the usual method involves heating the cheese with an atmosphere of warm air, other dry heat sources such as infrared lamps may also be employed.

Although overheating is the principal danger, the cheese should not be permitted to become too cold to permit efficient evaporation of the moisture. While the invention may be practiced at temperatures down to the freezing point of water, as a practical matter, the minimum temperature is about 40° F. The humidity of the circulating air is not critical, except, of course, that it must be below the saturation level.

The method of the present invention may be employed to dry most high-fat cheeses to moisture levels as low as about 34% (dry basis), which is far below the maximum legal moisture for cheeses of this type. Although it is possible to dry the cheese below 34% moisture, the process becomes very inefficient and time-consuming at such low moisture levels chiefly because of the relatively large size of the cheese chunks. Furthermore, cheese at such low moisture levels tends to develop an undesirable dry, crumbly texture.

After drying to the desired moisture level, the product may be marketed or may be blended with dried cheese to produce a top quality cheese product of the proper moisture content. The dried product may also be converted into a high-quality process cheese as, for example, by steam-injection cooking.

In order to enable those skilled in the art to fully understand the nature of the present invention, the following examples have been provided. These examples are, therefore, to be taken as illustrative rather than limitative, the scope of the invention being determined by the appended claims.

EXAMPLE I

Cheddar cheese with a moisture content of 41% was diced into ⅜ inch cubes and placed in a Link Belt Model 207–10 Roto-Louvre drum dryer, which has a drum diameter of 2.7 inches. The dryer was rotated at 1 r.p.m., giving a tumbling speed of about 97 inches per minute. The cheese cubes were fed continuously into the dryer at a rate of 313 lbs. per hour. Air was circulated through the dryer at a rate of 1,470 cubic feet per minute at an inlet temperature of about 100° F., emerging at an exhaust temeprature of about 72° F. The cheese was fed into one end of the dryer drum at an average temperature of 51° F., giving an average discharge temperature of 66° F., emerging from the discharge end of the drum after remaining in the dryer for 43 minutes. The dried cheese cubes had a dull surface with no oil discernible and showed no evidence of case-hardening. The moisture content of the product was 34.1% while there was no appreciable fat loss during the drying process, giving a product conforming to the standards of a high-quality Cheddar cheese.

EXAMPLE II

Cheddar cheese with a moisture content of 40.8% was diced into ⅜ inch cubes and fed into the same dryer as employed in Example I. The dryer was rotated at 1.4 r.p.m., giving a tumbling speed of about 138 inches per minute. The cheese cubes were fed continuously into the dryer at a rate of 370 lbs. per hour. Air was allowed to pass through the dryer at a rate of 1,470 cubic feet per minute at an inlet temperature of about 100° F., as in Example I. The exhaust temperature was 71° F. The cheese was fed into the dryer at an average temperature of 52° F., giving an average discharge temperature of 62.5° F. after remaining in the dryer for 37 minutes. As in Example I, there was no evidence of "oiling out," the dry cubes having a dull surface with no milk fat present. The moisture content of the product was 35.4% and the product showed no appreciable fat loss. The product thus had moisture and fat content equivalent to that of a high-quality Cheddar cheese and had, in addition, a very desirable texture and flavor, with no apparent case-hardening of the cheese surfaces.

Obviously many modifications and variations of the invention as hereinbefore set forth may be made without departing from the spirit and scope thereof, and therefore only such limitations should be imposed as are indicated in the appended claims.

We claim:
1. An improved process for drying cheese having an unsuitably high-moisture content in order to obtain a high-fat cheese product having a moisture content of from about 34% to about 42%, said process comprising: cutting said high-moisture cheese into chunks having a length, width and height of about ¼ inch to about 4 inches so that the chunks are of a size sufficiently large to avoid excessive mechanical working and sufficiently small to allow efficient drying; and heating said high-moisture cheese to a temperature of below about 95° F. in an atmosphere of circulating air having a temperature of from about 40° F. up to about 100° F. for a time sufficient to reduce the moisture content of the cheese to within a range of about 34% to about 42% and without any substantial loss of milk fat therefrom.

2. The process of claim 1 wherein said high-moisture cheese is tumbled at a linear velocity of below about 200 inches per minute during heating thereof.

3. The process of claim 2 wherein said cheese is Cheddar cheese.

References Cited

UNITED STATES PATENTS

| | | | |
|---|---|---|---|
| 1,752,521 | 4/1930 | Day | 99—115 |
| 2,789,909 | 4/1957 | Flosdorf | 99—162 X |
| 3,184,318 | 5/1965 | McCadam | 99—115 |

FOREIGN PATENTS 755,772  8/1956  Great Britain.

OTHER REFERENCES

Sanders G. P., Cheese Varieties and Descriptions, U.S. Department of Agriculture, AGR. Handbook No. 54 December 1953 (page 55).

LIONEL M. SHAPIRO, Primary Examiner

D. M. NAFF, Assistant Examiner

U.S. Cl. X.R.

99—162